(12) United States Patent
Bernard et al.

(10) Patent No.: US 8,402,818 B2
(45) Date of Patent: Mar. 26, 2013

(54) METHOD FOR ASSESSING THE SEAL OF A SERVOMOTOR HOUSING

(75) Inventors: Etienne Bernard, Paris (FR); Gilles Aubert-Maguero, Paris (FR)

(73) Assignee: Bernard Controls, Gonesse (FR)

( * ) Notice: Subject to any disclaimer, the term of this patent is extended or adjusted under 35 U.S.C. 154(b) by 281 days.

(21) Appl. No.: 13/055,172

(22) PCT Filed: Nov. 23, 2009

(86) PCT No.: PCT/FR2009/052256
§ 371 (c)(1),
(2), (4) Date: Feb. 4, 2011

(87) PCT Pub. No.: WO2010/061109
PCT Pub. Date: Jun. 3, 2010

(65) Prior Publication Data
US 2011/0120234 A1 May 26, 2011

(30) Foreign Application Priority Data
Nov. 28, 2008 (FR) ...................................... 08 58105

(51) Int. Cl.
*G01M 3/04* (2006.01)

(52) U.S. Cl. ......................................... 73/49.7; 73/49.8
(58) Field of Classification Search ....................... None
See application file for complete search history.

(56) References Cited

U.S. PATENT DOCUMENTS
3,031,884 A   5/1962   Martin

FOREIGN PATENT DOCUMENTS
| FR | 1 315 389 A | 1/1963 |
| FR | 2 761 471 A1 | 10/1998 |
| FR | 2 849 193 A1 | 6/2004 |
| JP | 07074370 A * | 3/1995 |

* cited by examiner

*Primary Examiner* — Andre Allen
(74) *Attorney, Agent, or Firm* — Leydig, Voit & Mayer, Ltd.

(57) ABSTRACT

A method for assessing sealing of a housing of a servomotor. The method includes lowering the pressure inside the housing, from an initial pressure to a set pressure, by fluid suction through an opening in the housing, the opening being normally sealed by a plug. When the pressure inside the housing is equal to the set pressure, pressure variation inside the housing, for a predetermined time interval, is determined. The fluid suction prevents any fluid exchange with the housing in a direction opposite a fluid suction direction. The sealing of the housing of the servomotor is assessed based on the pressure variation determined.

9 Claims, 1 Drawing Sheet

METHOD FOR ASSESSING THE SEAL OF A SERVOMOTOR HOUSING

FIELD OF THE INVENTION

Figure 1:
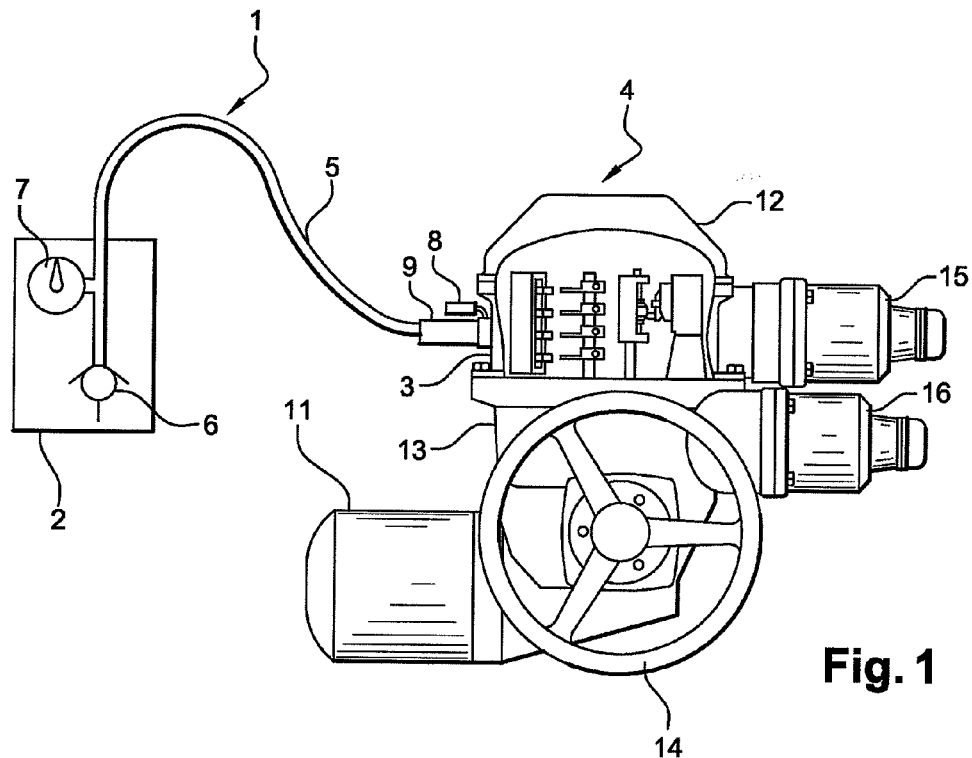

The present invention relates to a method for assessing the seal of a servomotor housing. It also relates to a device for carrying out the method.

BACKGROUND

A servomotor is designed to generate a precise movement of a mechanical component, for example an industrial valve, according to an external control. A servomotor is thus a motorized system capable of achieving predetermined positions, then maintaining them. The position is, in the case of a rotary servomotor, a corner position, and, in the case of a linear servomotor, a distance position. The start-up and preservation of the predetermined position are controlled by the external control.

One important parameter for the proper operation of the servomotor is its sealing. Indeed, in certain fluid pressurized environments, such as for example in nuclear power plants, the servomotors must be able to withstand high steam pressures, for example up to 5 or 6 bars.

The servomotor, although considered to be sealed, can have sealing flaws due for example to a defective joint or a poorly adjusted electrical cable in a cable inlet of the servomotor. If the servomotor is not completely sealed, pressurized steam risks penetrating the inside of the servomotor and damaging the electrical equipment of the servomotor.

It is known to regularly change the joints of the servomotor to offset these sealing problems. However, the joints can be poorly assembled. It is also possible for the sealing flaw not to be related to the joint, but for example a cracking of the housing of the servomotor. Changing the joints therefore does not make it possible to ensure that the servomotor is sealed in all cases.

It thus appears necessary to be able to simply and reliably assess the sealing of a servomotor housing.

The invention proposes a method making it possible to achieve this aim.

SUMMARY OF THE INVENTION

The invention thus relates to a method for assessing the seal of a housing of a servomotor, the servomotor comprising a motor unit suitable for generating a movement of a mechanical component, a unit for detecting the position of the mechanical component removably connected to a connector, as well as a mechanical unit removably connected to a connector and comprising the mechanical component and a manual control system, the mechanical component also comprising a communication space between the housing, the connector and the motor unit, the communication space being isolated and sealed relative to the mechanical unit, the method being implemented in the operational configuration of the servomotor, the connectors provided with their respective cables being installed, so as to test the sealing of the motor unit, the position-detecting unit and the connectors.

The method according to the invention comprises the following steps:

a step of lowering the pressure inside said housing, from an initial pressure to a set pressure, by implementing a fluid suction means connected to the servomotor by means of an opening in the housing, the opening being suitable for being sealed by a plug, when the pressure inside said housing is equal to the set pressure, a step of determining the pressure variation inside said housing over time, for a predetermined time interval, the fluid suction means not being implemented during said step, said fluid suction means also being connected to said housing so as to prevent any fluid exchange between the fluid suction means and the housing in the direction opposite the fluid suction direction, and a step of assessing the seal of the housing of the servomotor according to the determined pressure variation.

The housing of the servomotor can be considered sealed if, during the evolution of the determined pressure, the difference between the pressure inside the servomotor housing and the set pressure is below a predetermined value.

The initial pressure inside the servomotor housing is advantageously 1 bar.

The difference between the initial pressure inside the servomotor housing and the set pressure is preferably between 0.7 and 0.9 bar, and still more preferably between 0.75 and 0.85 bar.

The duration of the predetermined time interval of the step for determining the pressure variation is preferably between 10 and 20 minutes.

The method can be implemented in a nuclear power plant.

The invention also relates to a device for assessing the sealing of a servomotor housing.

The device according to the invention comprises:

a servomotor comprising a motor unit suitable for generating a movement of a mechanical component, a unit for detecting the position of the mechanical component removably connected to a connector, as well as a mechanical assembly removably connected to a connector and comprising the mechanical component and a manual control system, the mechanical unit also comprising a communication space between the housing, the connector and the motor unit, the communication space being isolated and sealed relative to the mechanical component, the connectors provided with their respective cables being installed, so as to test the sealing of the motor unit, the position-detecting unit and the connectors, a fluid suctioning means connected to the servomotor via an opening of the housing, the opening being suitable for being sealed by a plug, a means making it possible to prevent, between the fluid suction means and the housing, any passage of fluid in the direction opposite the fluid suction direction, and a means for measuring the pressure inside the housing.

The fluid suction means can be a pump, and the means making it possible to prevent any passage of fluid in the direction opposite the fluid suction direction can be a check device, such as a check valve, for example.

BRIEF DESCRIPTION OF DRAWING FIGURES

Figure 2:
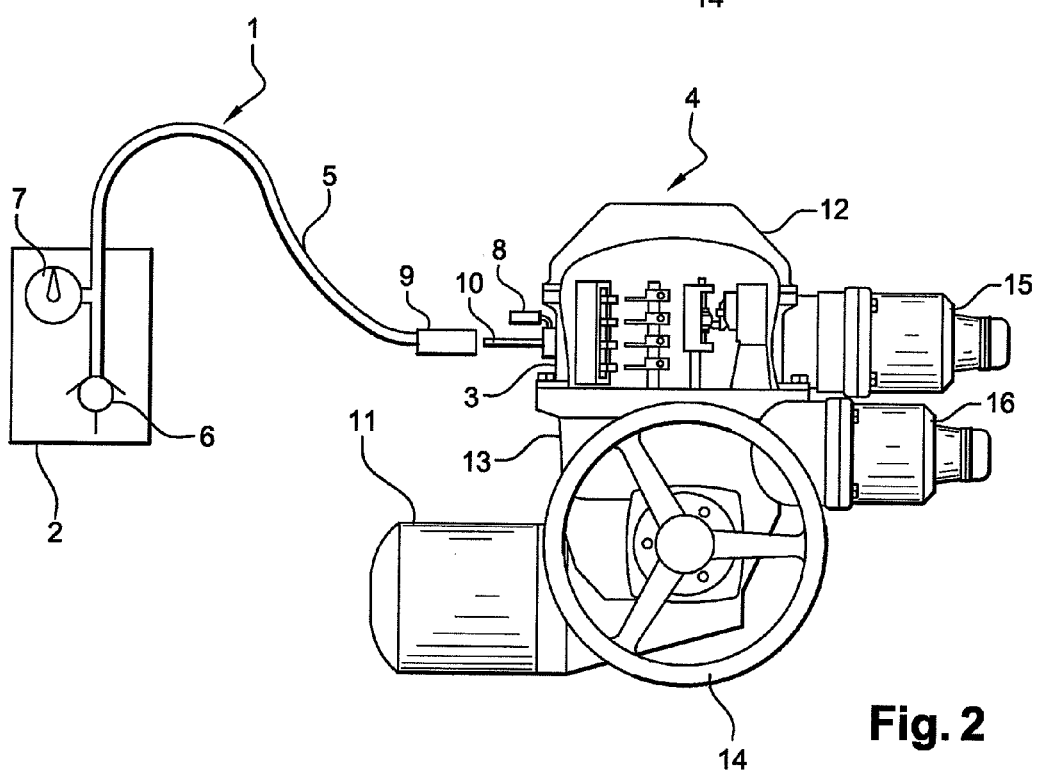

The advantages and other particularities of the invention will be described in the following description, provided solely as a non-limiting example, and done in reference to the appended drawings, in which:

FIG. 1 diagrammatically illustrates a device making it possible to implement the method according to the invention, in the operational configuration of the device, and FIG. 2 diagrammatically illustrates the device at the end of the method.

DETAILED DESCRIPTION

The device 1 according to the invention, as illustrated in FIG. 1, comprises a pump 2 powered by a battery, not shown.

The pump 2 is connected to the inside of a housing 3 of a servomotor 4 via a conduit 5. The device 1 also comprises a check valve 6 and a pressure sensor 7, positioned successively along the conduit 5, between the pump 2 and the housing 3.

To implement the method, an opening is made in the housing 3 of the servomotor 4, in order to connect the pump 2 to the servomotor 4. The opening can be closed by a plug 8, which is for example screwed on the housing 3. The plug 8 is chosen so as to maintain the sealing of the housing 3 when the opening is closed by the plug 8.

To connect the pump 2 to the servomotor 4, the plug 8 is unscrewed and an adaptor screwed into the orifice of the servomotor 4 is connected to a quick connector 9 positioned at the end of the conduit 5.

The servomotor 4 typically comprises a motor unit 11 suitable for generating a movement of a mechanical component, a position-detecting unit 12 of the mechanical component, and a unit 13 comprising the mechanical component and a manual control system. The unit 13 also comprises a communication space between the housing 3, a connector 16 and the motor unit 11. The communication space is isolated and sealed relative to the mechanical component. The mechanical component of the unit 13 is actuated by a manual control flywheel 14 positioned outside the housing 3.

The position-detecting unit 12 can be removably connected, for example by screwing, to a connector 15. The connector 15 makes it possible to connect the position-detecting unit 12 to a data transfer cable intended for the external control system. Likewise, the unit 13 can be removably connected, for example by screwing, to a connector 16. The connector 16 makes it possible to connect an electrical power cable to a connection circuit of the unit 13, said connection circuit being suitable for being connected to the motor unit 11. The electrical power cable makes it possible to transmit the control coming from the external control system to the servomotor 4.

Before testing the sealing, it is necessary to ensure that the connectors 15, 16 provided with their respective cables are installed. It is thus possible to test the sealing of the motor unit 11, the positioned-detecting unit 12, and connectors 15, 16.

Once the pump 2 is connected to the housing 3, the sealing assessment method can be implemented.

In a first step, the pressure is decreased inside the housing 3, using the pump 2, starting from an initial pressure, and up to a set pressure.

The initial pressure reigning in the servomotor is 1 bar ($10^5$ Pa). It has been observed that a difference between the initial pressure inside the servomotor 4 and the set pressure in the vicinity of 0.8 bar, between 0.7 and 0.9 bar, and preferably between 0.75 and 0.85 bar, enabled an effective assessment of the sealing.

When the set pressure is reached, the pump 2 is stopped. Owing to the check valve 6, which only allows a passage of fluid in a single direction, from the housing 3 towards the pump 2, there is no passage of air in the housing 3 via the conduit 5.

In a second step, the pressure variation over time is observed, using the pressure sensor 7. With a vacuum in the vicinity of 0.8 bar, it has been observed that the sealing could be assessed effectively by observing the pressure coming from the time interval starting with the stopping of the pump 2 and with a duration between 10 and 20 minutes, and in particular about 15 minutes.

If, after 15 minutes, the difference between the pressure inside the servomotor 4 and the set pressure is below a predetermined value, or better, if the difference is null, i.e., if no pressure increase is visible, the servomotor 4 is considered sealed. Conversely, if the difference between the pressure inside the servomotor 4 and the set pressure is greater than a predetermined value, i.e., if an increase is observed in the pressure inside the servomotor 4, the servomotor 4 is considered not to be sealed.

The method according to the invention involves a decrease of the pressure inside the housing 3 of the servomotor 4, which has the advantage of making the sealing devices of the servomotor 4 work in their usage direction, from the outside towards the inside of the servomotor 4. Moreover, the method implements air, and not water, which is more restrictive.

When the method is finished, the quick connection 9 is disconnected from the adapter 10, as illustrated in FIG. 2, in which the elements identical to those of FIG. 1 bear the same references. The adapter 10 constitutes a male portion removably connected to the quick connector 9. The adapter 10 is then unscrewed, then the plug 8 is screwed back on.

The method according to the invention is thus particularly simple to implement. It involves a light, transportable device at the foot of the servomotor that enables local monitoring of the sealing. The method also makes it possible to monitor any sealing flaw, for example a crack. A defective or poorly positioned seal will be detected immediately.

The method aims to guarantee to the user that once everything is installed and electrically connected on the site, it will be possible to verify the sealing of the servomotor. The same can be done in case of intervention on the site before recommissioning the servomotor.

The method makes it possible to verify the sealing of any housing of the servomotor, including the connected pieces, all sealing devices, the motor portion, the zone of the sensors and connectors, in a single test on the site and without external power.

The method also makes it possible to guarantee the sealing of the servomotor during its commissioning or after any other maintenance operation. The sealing test done on a servomotor that must function in case of nuclear accident, makes it possible to guarantee that the internal electrical equipment will operate under optimal conditions.

An easy-to-access connection makes it possible to connect the test tool when the device is mounted, electrically connected and verified on the site. The test tool is independent; it can be equipped with a rechargeable battery allowing a test locally close to the servomotor without electrical power of the sector.

Lastly, since on-site interventions require that the covers of the servomotor be opened by different teams, the method makes it possible to validate sealing after closing of the covers.

The invention claimed is:

1. A method for assessing sealing of a housing of a servomotor, the servomotor comprising a motor unit producing movement of a mechanical component, a position-detecting unit detecting position of the mechanical component, which is removably connected to a first connector and a mechanical unit, which is removably connected to a second connector, and a manual control system, the mechanical unit comprising a communication space between the housing, the second connector, and the motor unit, the communication space being isolated and sealed relative to the mechanical unit, the method being implemented with the first and second connectors connected to respective cables to test sealing of the motor unit, the position-detecting unit, and the first and second connectors, wherein the method comprises:

lowering pressure inside the housing, from an initial pressure to a set pressure, by operation of fluid suction means connected to the servomotor through an opening in the housing sealable by a plug, when the pressure inside housing is equal to the set pressure, determining pressure variation inside the housing over time, for a predetermined time interval, the fluid suction means being inoperative during the predetermined time interval, the fluid suction means being connected to the housing through a check device preventing any fluid exchange between the fluid suction means and the housing in a direction opposite a fluid suction direction; and assessing the sealing of the housing of the servomotor according to the pressure variation determined.

2. The method according to claim 1, including determining that the housing of the servomotor is sealed if, during the predetermined time period, difference between the pressure inside the housing and the set pressure remains below a predetermined value.

3. The method according to claim 1, wherein initial pressure inside the housing is 1 bar.

4. The method according to claim 3, wherein the difference between the initial pressure inside the housing and the set pressure is between 0.7 and 0.9 bar.

5. The method according to claim 4, wherein the difference between the initial pressure inside the housing and the set pressure is between 0.75 and 0.85 bar.

6. The method according to claim 4, wherein the predetermined time interval is between 10 and 20 minutes.

7. The method according to claim 1, implemented in a nuclear power plant.

8. A device for assessing sealing of a servomotor housing, comprising:
  a servomotor comprising
    a motor unit producing movement of a mechanical component,
    a position-detecting unit detecting position of the mechanical component and removably connected to a first connector,
    a mechanical unit removably connected to a second connector, and
    a manual control system, wherein
      the mechanical unit comprises a communication space between the housing, the second connector, and the motor unit, and
      the communication spaces is isolated and sealed relative to the mechanical component and the first and second connectors connected to respective cables for testing the sealing of the motor unit, the position-detecting unit, and the first and second connectors;
  fluid suctioning means connected to the servomotor via an opening of the housing, the opening being sealable by a plug,
  means for preventing leakage, between the fluid suction means and the housing, of fluid in a direction opposite a fluid suction direction, and
  means for measuring pressure inside the housing.

9. The device according to claim 8, wherein
the fluid suction means is a pump, and
the means for preventing passage is a check device.

* * * * *